(12) United States Patent
Wellington

(10) Patent No.: US 9,161,519 B1
(45) Date of Patent: Oct. 20, 2015

(54) PLANT SUPPORTING AQUARIUM FILTER DEVICE

(71) Applicant: David L. Wellington, Wheat Ridge, CO (US)

(72) Inventor: David L. Wellington, Wheat Ridge, CO (US)

( * ) Notice: Subject to any disclaimer, the term of this patent is extended or adjusted under 35 U.S.C. 154(b) by 82 days.

(21) Appl. No.: 14/173,475

(22) Filed: Feb. 5, 2014

(51) Int. Cl.
  *A01K 63/00* (2006.01)
  *A01K 63/04* (2006.01)

(52) U.S. Cl.
  CPC ............. *A01K 63/006* (2013.01); *A01K 63/045* (2013.01)

(58) Field of Classification Search
  CPC .... A01K 63/003; A01K 63/04; A01K 63/042
  USPC .......................................... 119/259, 260, 261
  See application file for complete search history.

(56) References Cited

U.S. PATENT DOCUMENTS

| | | | |
|---|---|---|---|
| 2,306,027 A * | 12/1942 | Swaney | ............................. 47/79 |
| 3,151,069 A | 9/1964 | Halpert | |
| 3,247,826 A | 4/1966 | Girard | |
| 3,565,042 A | 2/1971 | Willinger | |
| 3,722,685 A | 3/1973 | Orensten et al. | |
| 3,827,560 A | 8/1974 | Morton | |
| 4,004,551 A | 1/1977 | Kato | |
| 4,216,090 A | 8/1980 | Dockery | |
| D280,658 S | 9/1985 | Willinger | |
| 5,127,366 A * | 7/1992 | Kim | .............................. 119/246 |
| 5,618,428 A * | 4/1997 | Oslund | ......................... 210/602 |
| 7,934,471 B2 | 5/2011 | Ford | |
| 2014/0223819 A1* | 8/2014 | Coghlan | ....................... 47/62 R |

* cited by examiner

*Primary Examiner* — Tien Dinh
*Assistant Examiner* — Aaron Rodziwicz

(57) ABSTRACT

A plant supporting aquarium filter device supports and incorporates a plant into filtering of water within an aquarium. The device includes a perimeter wall defining a cylinder surrounding an interior space. A tube is insertable into the cylinder. A tray is coupled to the tube and positionable in the interior space supporting the tube within the cylinder such that a bottom end of the tube is positioned in spaced relationship to a bottom of the cylinder, The tray divides the interior space into a top section in fluid communication with a bottom section. A hose injects air into the tube inducing fluid flow through the cylinder. A plant supporting material is positioned on the tray for filtering fluid drawn through the interior space into the tube.

15 Claims, 5 Drawing Sheets

PLANT SUPPORTING AQUARIUM FILTER DEVICE

BACKGROUND OF THE DISCLOSURE

Field of the Disclosure

The disclosure relates to aquarium filter devices and more particularly pertains to a new aquarium filter device for supporting and incorporating a plant into filtering of water within an aquarium.

SUMMARY OF THE DISCLOSURE

An embodiment of the disclosure meets the needs presented above by generally comprising a perimeter wall defining a cylinder surrounding an interior space. A tube is insertable into the cylinder. A tray is coupled to the tube and positionable in the interior space supporting the tube within the cylinder such that a bottom end of the tube is positioned in spaced relationship to a bottom of the cylinder, The tray divides the interior space into a top section in fluid communication with a bottom section. A hose injects air into the tube inducing fluid flow through the cylinder. A plant supporting material is positioned on the tray for filtering fluid drawn through the interior space into the tube.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
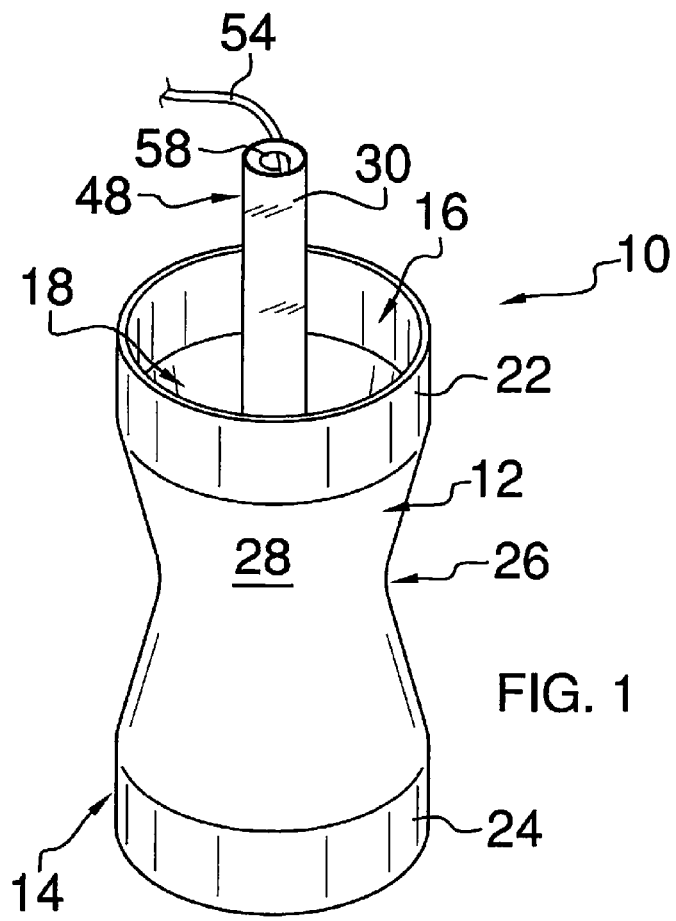
FIG. 1 is a top front side perspective view of a plant supporting aquarium filter device according to an embodiment of the disclosure.
Figure 2:
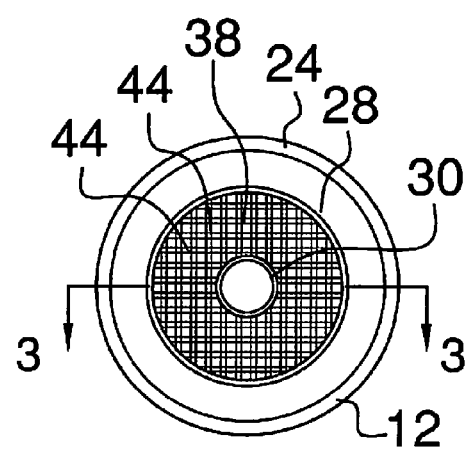
FIG. 2 is a bottom view of an embodiment of the disclosure.
Figure 3:
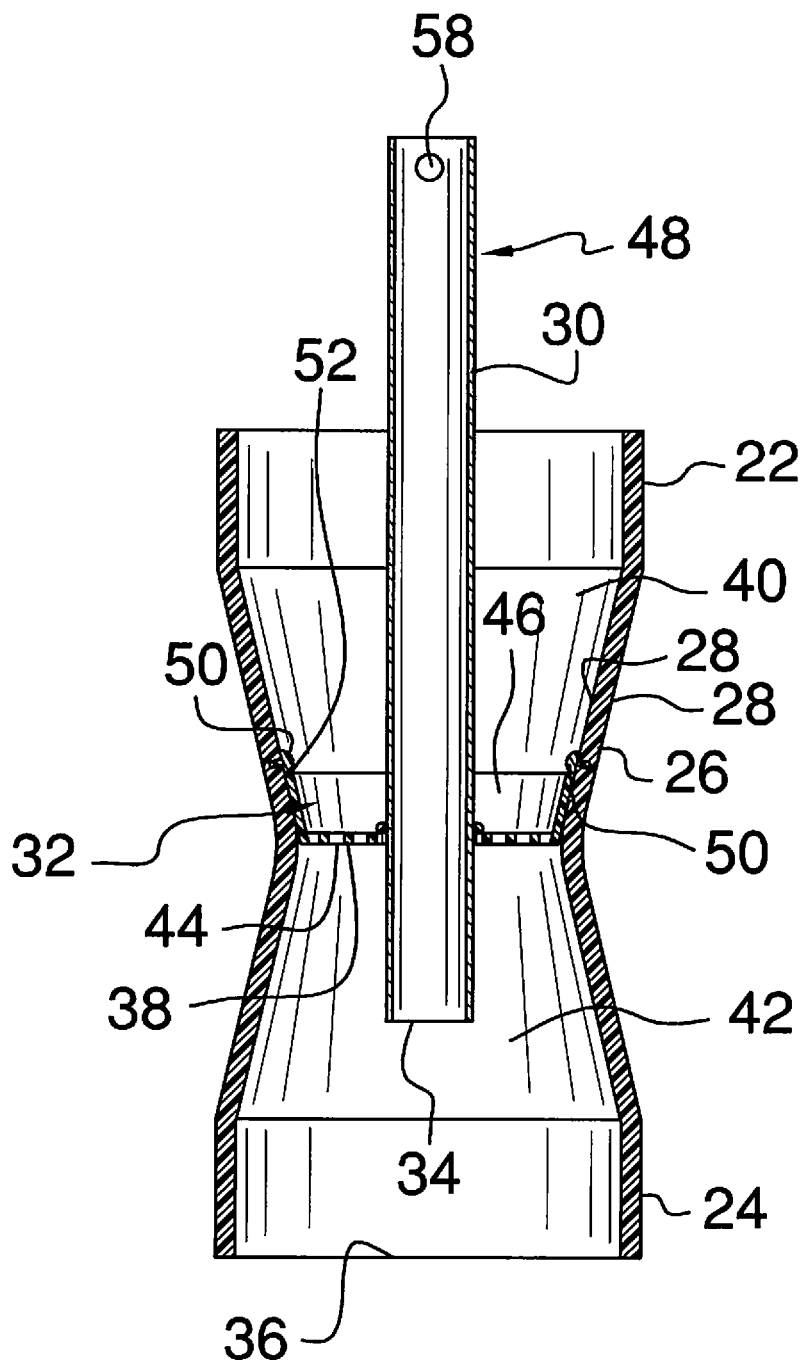
FIG. 3 is a cross-sectional view of an embodiment of the disclosure taken along line 3-3 of FIG. 2.
Figure 4:
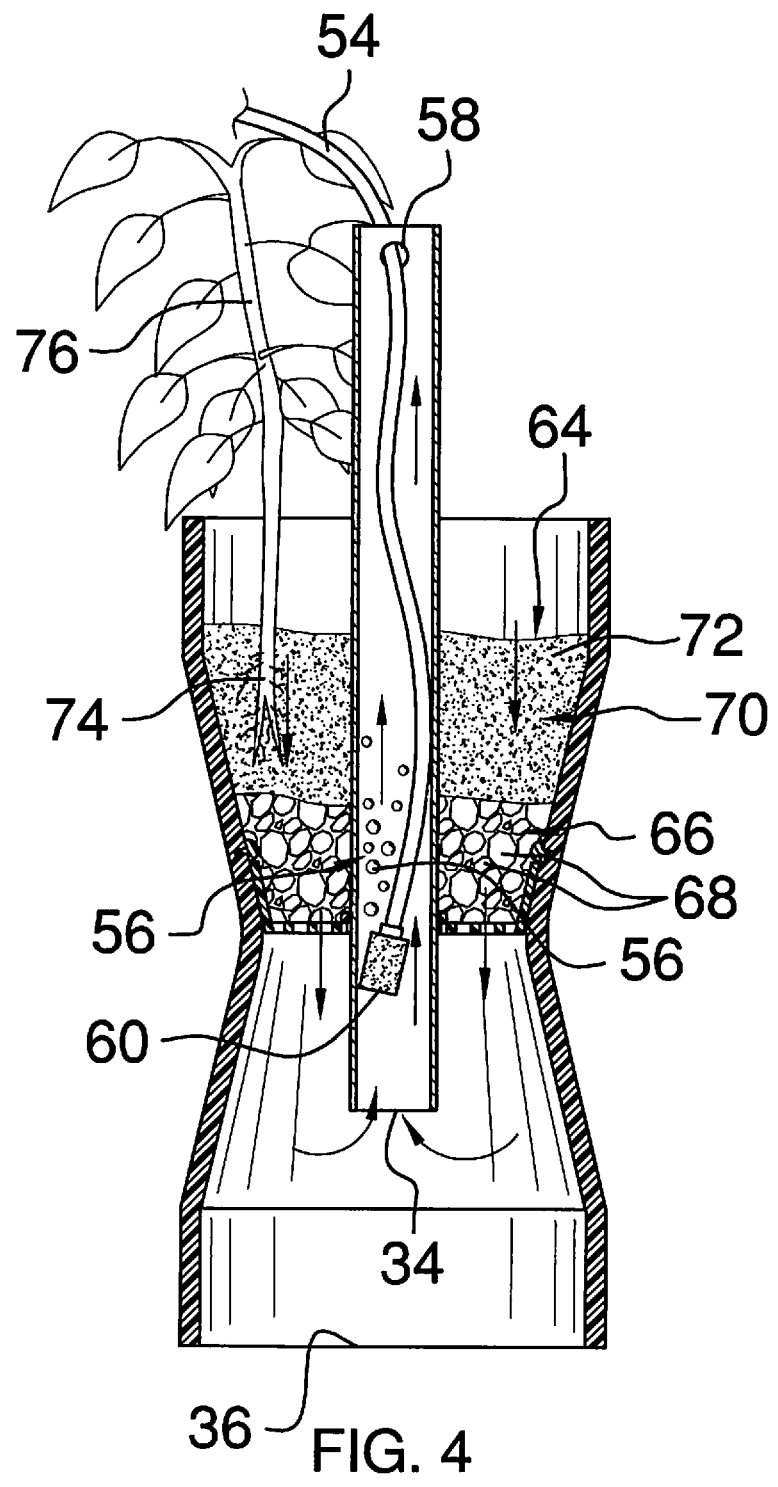
FIG. 4 is a cross-sectional view of an embodiment of the disclosure similar to FIG. 3 showing the device in use.
Figure 5:
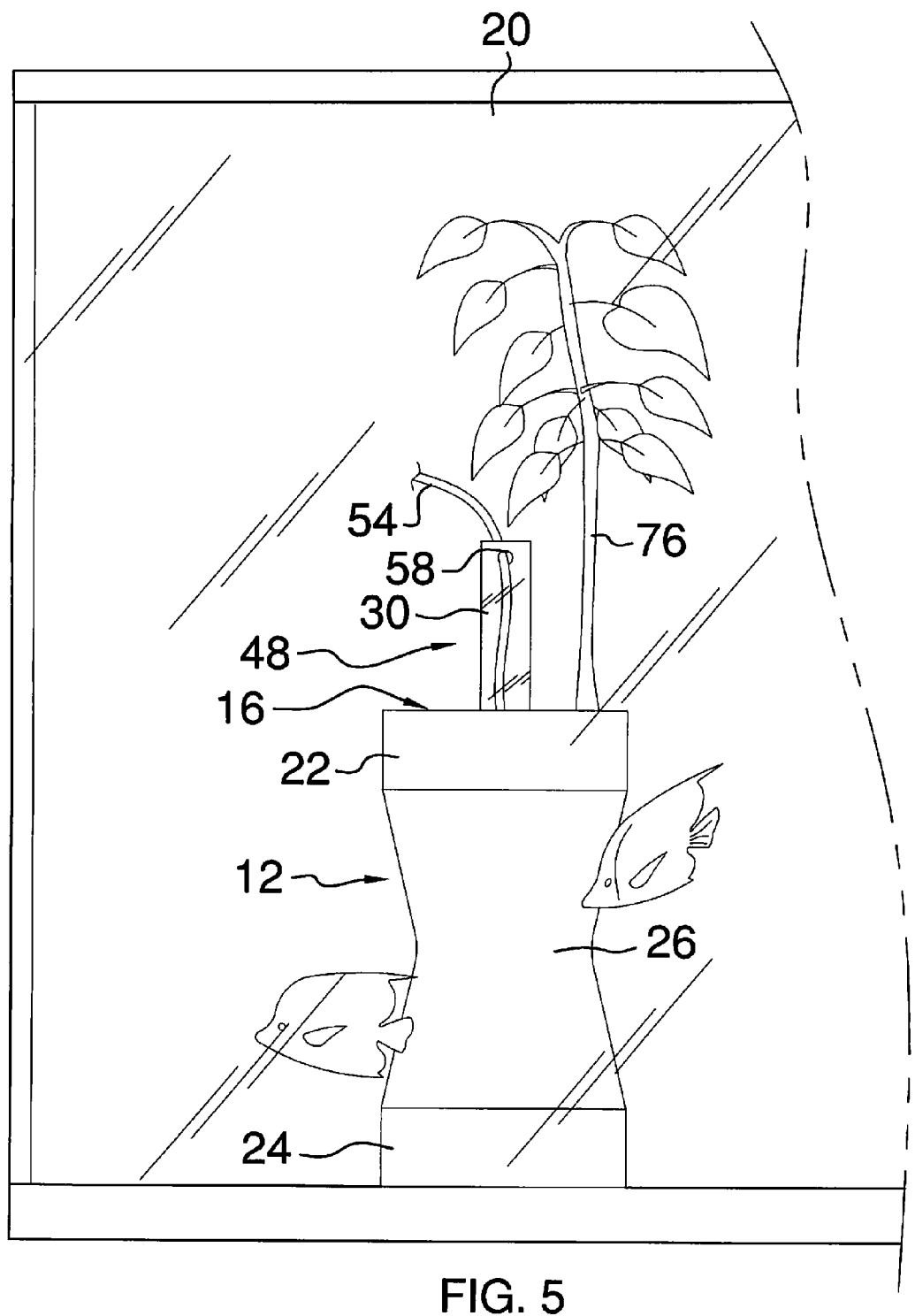
FIG. 5 is a front view of an embodiment of the disclosure in use.
Figure 6:
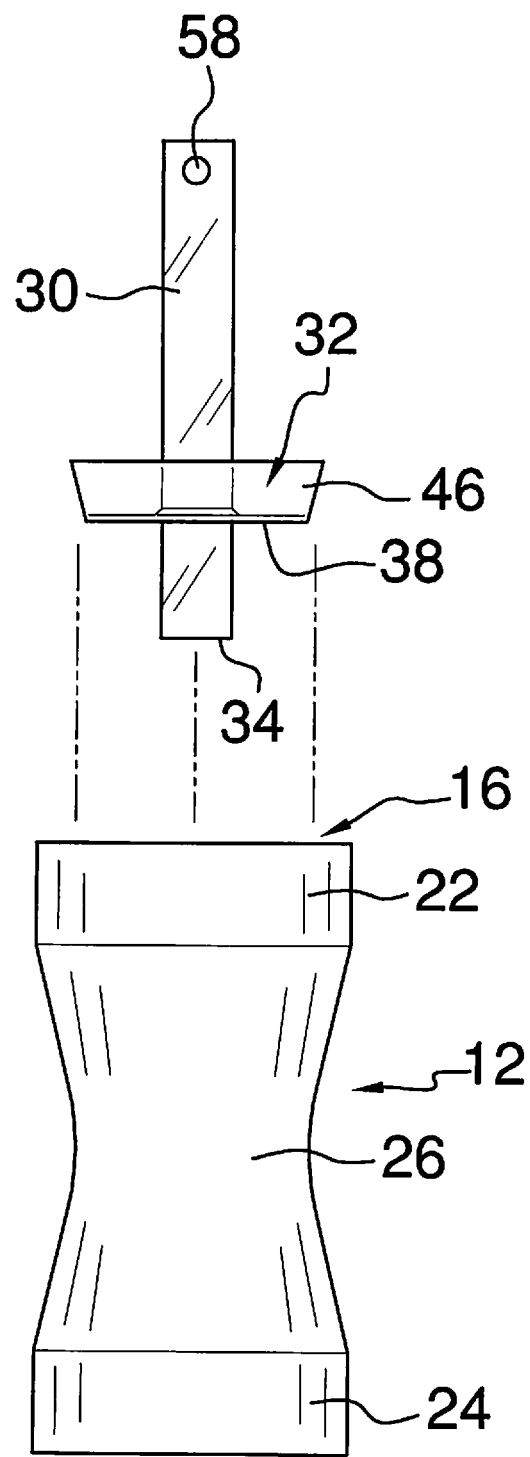
FIG. 6 is a partially exploded front view of an embodiment of the disclosure.

With reference now to the drawings, and in particular to FIGS. 1 through 6 thereof, a new aquarium filter device embodying the principles and concepts of an embodiment of the disclosure and generally designated by the reference numeral 10 will be described.

As best illustrated in FIGS. 1 through 6, the plant supporting aquarium filter device 10 generally comprises a perimeter wall 12 defining a cylinder 14 having an open top 16. The cylinder 14 surrounds an interior space 18. The perimeter wall 12 may be constructed of a ceramic material and used in an aquarium 20 holding fish of a type that regularly attached to surfaces within the aquarium 20. Thus, the perimeter wall 12 enhances the surface space available within the aquarium for such fish to utilize. The perimeter wall 12 has a top section 22 and a bottom section 24. The top section 22 of the perimeter wall 12 has a diameter equivalent to a diameter of the bottom section 24 of the perimeter wall 12. The top section 22 of the perimeter wall 12 may be vertically aligned with the bottom section 24 of the perimeter wall 12. A medial section 26 of the perimeter wall 12 tapers inwardly extending downwardly relative to the open top 16 producing angled surfaces 28 inside and outside the cylinder 14.

A tube 30 is insertable into the cylinder 14 through the open top 16. The tube 30 may be constructed of a plastic material and be transparent. A tray 32 is coupled to the tube 30. The tray 32 is positionable in the interior space 18 supporting the tube 30 within the cylinder 14 such that a bottom end 34 of the tube 30 is positioned in spaced relationship to a bottom 36 of the cylinder 14. The tray 32 has a bottom wall 38. When the tube 30 is inserted into the cylinder 14, the bottom wall 38 divides the interior space 18 into a top section 40 and a bottom section 42. The bottom wall 38 of the tray 32 is perforated by a plurality of holes 44. Thus, the top section 40 is in fluid communication with the bottom section 42. The tray 32 has a peripheral wall 46 coupled to and extending from the bottom wall 38. A top section 48 of the tube 30 extends upwardly from the cylinder 14 when the tray 32 is fully inserted into the cylinder 14. The peripheral wall 46 of the tray 32 is angled relative to the bottom wall 38 to be complementary to and abut an upper one of the angled surfaces 28 of the medial section 28 of the perimeter wall 12 wherein the tray 32 is supported in the interior space 18. At least one protrusion 50 extends inwardly into the interior space 18 from the perimeter wall 12. Each protrusion 50 is positioned adjacent to and extends over a top edge 52 of the peripheral wall 46 of the tray 32 when the tray 32 is fully inserted into the interior space 18 abutting the upper one of the angled surfaces 28. Thus, the protrusions 50 retain the tray 32 in a stable position. The protrusions 50 are designed such that the tray 32 remains selectively removable from the interior space 18 when sufficient force is applied to disengage the top edge 52 from the protrusions 50.

A hose 54 is positionable in the tube 30 wherein the hose 54 is configured for injecting air 56 into the tube 30 inducing fluid flow through the cylinder 14. Thus, the tube 30 draws fluid flow into the interior space 18 through the bottom wall 38 of the tray 32 and into the tube 30 from the bottom section 42 of the interior space 18. An aperture 58 extends through the top section 48 of the tube 30. The hose 54 is selectively insertable through the aperture 58 such that the hose 54 extends into the tube 30 through the aperture 58. An air stone 60 may be coupled to a free end 62 of the hose 54.

A plant supporting material 64 is positioned on the tray 32 in the top section 40 of the interior space 18 wherein the plant supporting material 64 is configured for filtering fluid drawn downwardly through the interior space 18 before entering into the tube 30. The plant supporting material 64 may comprise a layer 66 of rocks 68 positioned on the tray 32 and a layer 70 of substrate 72 positioned on the layer 66 of rocks 68 forming a filter. The substrate 72 is of the type conventionally known and used in aquariums generally. The substrate 72 receives and supports the roots 74 of a plant 76 such that the plant 76 may live rooted in the substrate 72. The roots 74 supplement the filtering provided as fluid flows through the plant supporting material 64.

In use, the perimeter wall 12 is positioned in the aquarium 20. The tray 32 and tube 30 are positioned in the interior space 18 and the hose 54 is inserted into the tube 30. The plant supporting material 64 is positioned in the tray 32 and one or more plants 76 are planted within the substrate 72. Air 56 is pumped into the tube 30 through the hose 54 providing fluid flow and the filtering described above.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A plant supporting aquarium filter device comprising:
a perimeter wall defining a cylinder having an open top, said cylinder surrounding an interior space;
a tube insertable into said cylinder through said open top;
a tray coupled to said tube, said tray being positionable in said interior space supporting said tube within said cylinder such that a bottom end of said tube is positioned in spaced relationship to a bottom of said cylinder, said tray having a bottom wall, said bottom wall dividing said interior space into a top section and a bottom section, said top section being in fluid communication with said bottom section;
a hose positionable in said tube wherein said hose is configured for injecting air into said tube inducing fluid flow through said cylinder wherein said tube draws fluid flow into said interior space through said bottom wall and into said tube; and
a plant supporting material being positioned on said tray in said top section of said interior space wherein said plant supporting material is configured for filtering fluid drawn through said interior space into said tube.

2. The device of claim 1, further comprising a medial section of said perimeter wall tapering inwardly extending downwardly relative to said open top.

3. The device of claim 2, further comprising said tray having a peripheral wall, said peripheral wall being complementary to and abutting said medial section of said perimeter wall wherein said tray is supported in said interior space.

4. The device of claim 3, further comprising a protrusion extending inwardly into said interior space from said perimeter wall, said protrusion being positioned adjacent to and extending over a top edge of said peripheral wall of said tray when said tray is fully inserted into said interior space.

5. The device of claim 1, further comprising said plant supporting material comprising a layer of rocks positioned on said tray.

6. The device of claim 5, further comprising said plant supporting material comprising a layer of substrate positioned on said layer of rocks.

7. The device of claim 1, further comprising a top section of said tube extending upwardly from said cylinder when said tray is fully inserted into said cylinder.

8. The device of claim 7, further comprising an aperture extending through said top section of said tube, said hose being selectively insertable through said aperture such that said hose extends into said tube through said aperture.

9. The device of claim 1, further comprising said perimeter wall being constructed of a ceramic material.

10. The device of claim 1, further comprising said tube being constructed of a plastic material.

11. The device of claim 10, further comprising said tube being transparent.

12. The device of claim 1, further comprising said perimeter wall having a top section and a bottom section, said top section of said perimeter wall having a diameter equivalent to a diameter of said bottom section of said perimeter wall, said top section of said perimeter wall being vertically aligned with said bottom section of said perimeter wall.

13. The device of claim 1, further comprising said bottom wall of said tray being perforated.

14. The device of claim 1, further comprising an air stone being coupled to a free end of said hose.

15. A plant supporting aquarium filter device comprising:
a perimeter wall defining a cylinder having an open top, said cylinder surrounding an interior space, said perimeter wall being constructed of a ceramic material, said perimeter wall having a top section and a bottom section, said top section of said perimeter wall having a diameter equivalent to a diameter of said bottom section of said perimeter wall, said top section of said perimeter wall being vertically aligned with said bottom section of said perimeter wall, a medial section of said perimeter wall tapering inwardly extending downwardly relative to said open top;
a tube insertable into said cylinder through said open top, said tube being constructed of a plastic material, said tube being transparent;
a tray coupled to said tube, said tray being positionable in said interior space supporting said tube within said cylinder such that a bottom end of said tube is positioned in spaced relationship to a bottom of said cylinder, said tray having a bottom wall, said bottom wall dividing said interior space into a top section and a bottom section, said bottom wall of said tray being perforated wherein said top section is in fluid communication with said bottom section, said tray having a peripheral wall coupled to and extending from said bottom wall, a top section of said tube extending upwardly from said cylinder when said tray is fully inserted into said cylinder, said peripheral wall of said tray being complementary to and abutting said medial section of said perimeter wall wherein said tray is supported in said interior space;
a protrusion extending inwardly into said interior space from said perimeter wall, said protrusion being positioned adjacent to and extending over a top edge of said peripheral wall of said tray when said tray is fully inserted into said interior space;
a hose positionable in said tube wherein said hose is configured for injecting air into said tube inducing fluid flow through said cylinder wherein said tube draws fluid flow into said interior space through said bottom wall and into said tube;

an aperture extending through said top section of said tube, said hose being selectively insertable through said aperture such that said hose extends into said tube through said aperture;

an air stone being coupled to a free end of said hose; and a plant supporting material being positioned on said tray in said top section of said interior space wherein said plant supporting material is configured for filtering fluid drawn through said interior space into said tube, said plant supporting material comprising a layer of rocks positioned on said tray, said plant supporting material comprising a layer of substrate positioned on said layer of rocks.

* * * * *